US007830253B2

(12) United States Patent
Gerszberg et al.

(10) Patent No.: US 7,830,253 B2
(45) Date of Patent: *Nov. 9, 2010

(54) FSOC/RADIO INTRUSION DETECTION SYSTEM

(75) Inventors: Irwin Gerszberg, Kendall Park, NJ (US); Jeremiah A. Okoro, Landing, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/330,594

(22) Filed: Dec. 9, 2008

(65) Prior Publication Data

US 2009/0243851 A1    Oct. 1, 2009

Related U.S. Application Data

(63) Continuation of application No. 11/526,469, filed on Sep. 25, 2006, now Pat. No. 7,486,186, which is a continuation of application No. 10/733,719, filed on Dec. 11, 2003, now Pat. No. 7,119,680.

(51) Int. Cl.
    *G08B 13/00* (2006.01)
(52) U.S. Cl. ...................................................... 340/541
(58) Field of Classification Search ................. 340/541, 340/545.3, 545.4, 552, 551, 555, 562; 343/894; 398/118
See application file for complete search history.

(56) References Cited

U.S. PATENT DOCUMENTS

| | | | | | |
|---|---|---|---|---|---|
| 3,688,298 | A | * | 8/1972 | Miller et al. | 340/557 |
| 5,440,290 | A | * | 8/1995 | McCullough et al. | 340/552 |
| 5,966,229 | A | * | 10/1999 | Dodley et al. | 398/120 |
| 6,889,009 | B2 | * | 5/2005 | Willebrand | 398/115 |
| 7,286,766 | B2 | * | 10/2007 | Shelton et al. | 398/119 |

* cited by examiner

*Primary Examiner*—Phung Nguyen
(74) *Attorney, Agent, or Firm*—Andrew Gust; Ed Guntin; Guntin Meles & Gust, PLC

(57) ABSTRACT

Certain exemplary embodiments provide a method comprising sensing an intruder within a predetermined vicinity of a Free Space Optical Communication (FSOC) system; and reducing an emitted power of the FSOC system. Certain exemplary embodiments provide a system comprising a Free Space Optical Communication (FSOC) subsystem; a sensor adapted to detect an intruder within a predetermined vicinity of the FSOC subsystem; and a switch adapted to reduce an emitted power of the FSOC subsystem, said switch coupled to said sensor.

18 Claims, 4 Drawing Sheets

FSOC/RADIO INTRUSION DETECTION SYSTEM

CROSS REFERENCE TO RELATED APPLICATIONS

This application is a continuation of U.S. application Ser. No. 11/526,469 filed on Sep. 25, 2006, now U.S. Pat. No. 7,486,186, which is a continuation of U.S. application Ser. No. 10/733,719, filed Dec. 11, 2003, now U.S. Pat. No. 7,119,680.

BACKGROUND

United States Patent Application 20030035178 (Seaver), which is incorporated by reference herein in its entirety, allegedly cites a "system comprising a solid-state optical beam regulator, an optical sensing device, and a computer provides for fast, accurate, and automatic tracking, steering, and shaping of an optical beam, such as that required in free-space optical communications. With a CMOS imager as the sensing device and a regulator constructed of a stress-optic glass material whose index of refraction is altered by induced stress, the system can track beam perturbations at frequencies greater than 1 kHz. This performance makes the system suitable for a variety of applications in free-space optical communications." See Abstract.

U.S. Pat. No. 6,522,437 (Presley), which is incorporated by reference herein in its entirety, allegedly cites an "electronically agile multi-beam optical transceiver has a first crossbar switch, that switches input signals to selected ones of a spatial array of light emitters. The light emitters supply modulated light beams to spatial locations of a telecentric lens, which geometrically transforms the beams along different divergence paths, in accordance with displacements from the lens axis of the light emitter elements within the spatial array. Light beams from remote sites incident on a divergence face of the telecentric lens are deflected to a photodetector array, outputs of which are coupled to a second crossbar switch. An auxiliary photodetector array monitors optical beams from one or more sites whose spatial locations are known, and supplies spatial error correction signals for real-time pointing and tracking and atmospheric correction." See Abstract.

U.S. Pat. No. 6,643,519 (Lundgren), which is incorporated by reference herein in its entirety, allegedly cites that "[a]utomatic control of the power of the transmitters ($16.sub.1$ and $16.sub.2$) of a near-end-far-end transceiver pair ($12.sub.1$-$14.sub.1$) is achieved by first determining whether the strength of the signals received at near-end and far-end receivers ($18.sub.1$ and $18.sub.2$) of the near-end-far-end transceiver pair are simultaneously attenuated a prescribed value below received signal strength values measured during clear weather free-space conditions. If the received signal strengths are so attenuated, then transmission power of the near-end and far-end transceivers is increased by predetermined increments (or sequences or increments) to restore, but not exceed the strengths of the received signals to their respective signal strength values measured during clear weather free-space conditions. Conversely, if the above received signal strengths are determined not to be simultaneously attenuated by the said prescribed value, when one near-end or far-end received signal only is determined to be degraded (e.g., bit error ratio in excess of a given acceptable threshold value), then the transmission power of the far-end or near-end transceiver, respectively is increased either only sufficiently to restore the said degraded bit error ratio to acceptable, or until the predetermined upper limit of the allowable clear-weather transmitter power increase is reached. A variation of the latter limited automatic power control case (non-attenuated signals) accommodates the determination of degraded signals as received at both said transceivers, by increasing the transmission power of both said transceivers either only sufficiently to restore the said degraded bit error ratios to acceptable, or until the predetermined upper limit of the allowable clear-weather transmitter power increase is reached." See Abstract.

BRIEF DESCRIPTION OF THE DRAWINGS

A wide variety of potential embodiments will be more readily understood through the following detailed description, with reference to the accompanying drawings in which.

SUMMARY

Figure 1:
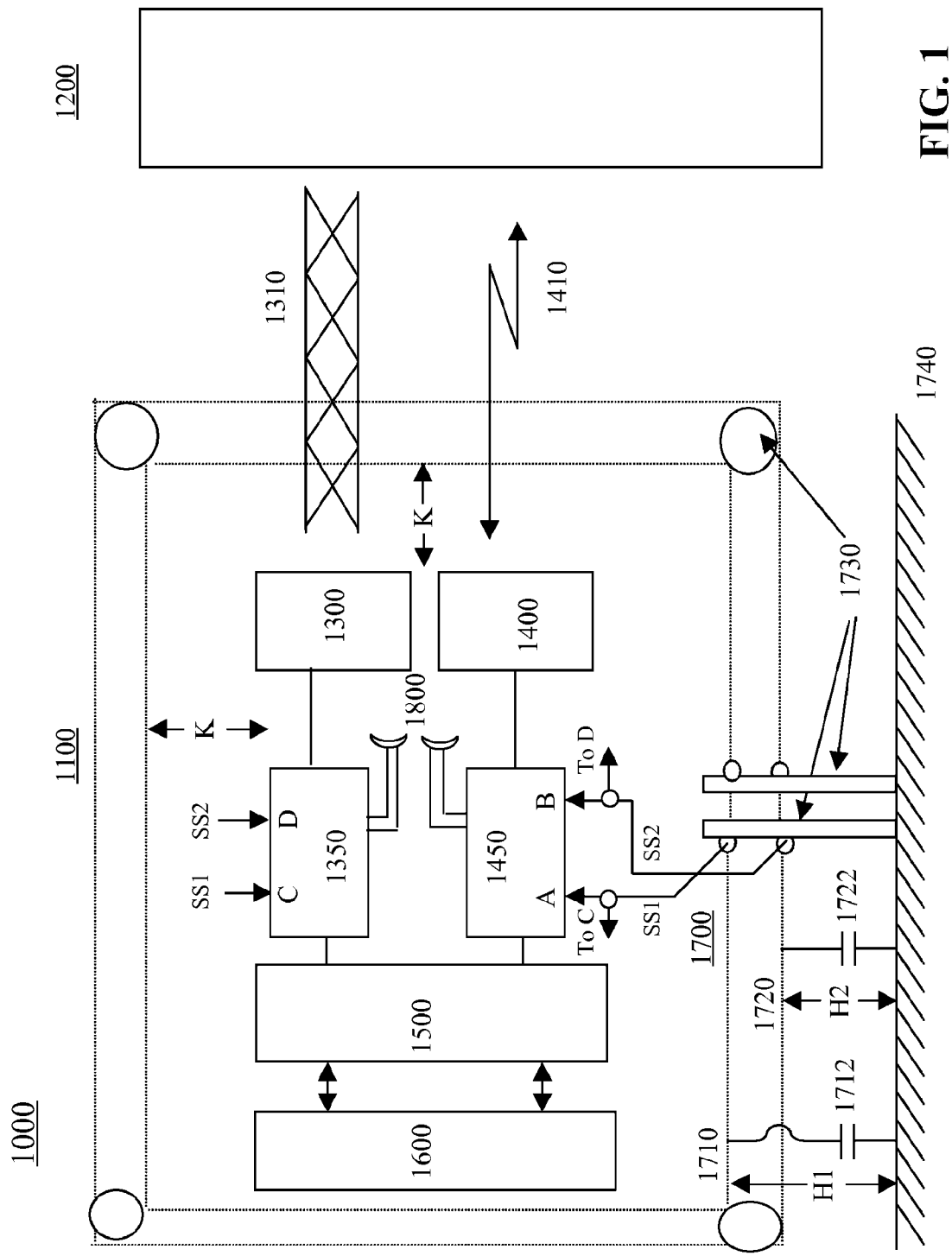
FIG. 1 is a block diagram of an exemplary embodiment of a system 1000.

Certain exemplary embodiments provide a method comprising sensing an intruder within a predetermined vicinity of a Free Space Optical Communication (FSOC) system; and reducing an emitted power of the FSOC system. Certain exemplary embodiments provide a system comprising a FSOC subsystem; a sensor adapted to detect an intruder within a predetermined vicinity of the FSOC subsystem; and a switch adapted to reduce an emitted power of the FSOC subsystem, said switch coupled to said sensor.

DEFINITIONS

When the following terms are used herein, the accompanying definitions apply:

sensing—to detect or perceive automatically.

sensor—a device used to measure a physical quantity (e.g., temperature, pressure, capacitance, and/or loudness, etc.) and convert that physical quantity into a signal of some kind (e.g., voltage, current, power, etc.).

capacitive proximity sensor—a device used to measure a change in capacitance of a capacitor caused by a change in a stored charge, dielectric, or gap of the capacitor.

intruder—an unauthorized person or animal.

Free Space Optical Communications—a line-of-sight (LOS) technology that transmits a modulated beam of visible or infrared light through the atmosphere for broadband communications. In a manner similar to fiber optical communications, free space optics can use a light emitting diode (LED) or laser (light amplification by stimulated emission of radiation) point source for data transmission. In free space optics, however, an energy beam is collimated and transmitted through space rather than being guided through an optical cable. These beams of light, operating in the TeraHertz portion of the spectrum, can be focused on a receiving lens connected to a high sensitivity receiver through an optical fiber.

radio system—a communications technology operable in the radio frequency portion of the electromagnetic spectrum.

automatically—acting or operating in a manner essentially independent of external influence or control. For example, an automatic light switch can turn on upon "seeing" a person in its view, without the person manually operating the light switch.

emitted power—the power output by a device.

hazardous—characterized by danger; perilous to a human or animal.

communications link—an established communication channel.

render—to make perceptible.

alarm—a warning of existing or approaching danger.

switch—a device that substantially diverts a signal.

vicinity—a surrounding or nearby region.

perimeter—the outer limits or boundary of an area.

installation site—a location where something is installed.

absence—a state of being absent or withdrawn from an area.

DETAILED DESCRIPTION

Free Space Optical Communication (FSOC)/Radio (FR) systems can utilize high powered laser and/or radio beams (including, for example, radio waves having microwave or higher frequencies) that can cause catastrophic damage if one is directly irradiated by the beam. Currently, no known FR system has a built-in warning system that alerts one who intrudes within the installation area of a danger that lies in the area.

In certain exemplary embodiments, an intrusion detection system (IDS) can monitor a hazardous area defined within about a 10 feet radius of an FR installation site for possible intruders. If the IDS detects an intruder, it can 1) sound an alarm/siren alerting the intruder of the radiation danger, 2) switch to a low power state in which the emitted power is not harmful to the intruder, yet allows the communications link to stay operative, 3) activate a video and/or audio recording device to capture evidence of the intrusion; and/or 4) notify a central office of the intrusion. When the intruder goes away, the system switches back to the high power mode.

The IDS can be of any type. In certain exemplary embodiments, the IDS can comprise any intrusion sensor, such as a capacitive proximity sensor and/or a capacitive position sensor. In an exemplary embodiment of a capacitive proximity sensor, at least one pair of substantially horizontal wires, such as 12 gauge wires, can be strung around a perimeter of an FR site, a first of the wires at a first elevation and a second of the wires at a second, lower elevation, beneath the first wire. In addition to serving as a form of fence, the wires can be energized with a low voltage, and a capacitance can form between each wire and ground, with air as the dielectric. Because an intruder has a much higher dielectric constant than air, a voltage will be induced in each wire if an intruder moves beneath either wire. The IDS can detect this change in voltage. Additional wires and/or wire pairs can be used to determine the nature and/or direction of the intruder's movements.

An output of the intrusion sensor can be provided to a FR signal adapter unit (FR-SAU), which can be a hybrid component with optical and electrical inputs, and which can be built inside a FR system outdoor unit (ODU). The optical section of the FR-SAU can have a through path with low loss, and a high attenuation path for minimum power link operation. Each optical path can be selectable by the optical switches. Similarly, the radio section can have a through path with low loss, and a high attenuation path for minimum power link operation. Each radio path can be selectable by the electrical switches. A control signal generator circuit can provide control signals to the switches.

FIG. 1 is a block diagram of an exemplary embodiment of a system 1000, which can comprise a local FSOC installation 1100 that can be communicatively coupled to a remote FSOC installation 1200, which can structurally and/or functionally duplicate local FSOC installation 1100.

In certain exemplary embodiments, local FSOC installation 1100 can comprise an optical outdoor unit 1300 that can transmit and/or receive optical signals 1310 to and/or an optical outdoor unit of remote FSOC installation 1200. The optical signals 1310 transmitted and/or received by optical outdoor unit 1300 can be provided from and/or to a hybrid modem 1500 via an optical signal adapter 1350. Hybrid modem 1500 can be controlled by a processor 1600. When optical outdoor unit 1300 is transmitting optical signals 1310, optical signal adapter 1350 can control an emitted optical power of optical outdoor unit 1300 and/or local FSOC installation 1100.

In certain exemplary embodiments, local FSOC installation 1100 can comprise a radio outdoor unit 1400 that can transmit and/or receive radio signals 1410 to and/or from a radio outdoor unit of remote FSOC installation 1200. The radio signals transmitted and/or received by radio outdoor unit 1400 can be provided from and/or to a hybrid modem 1500 via a radio signal adapter 1450. Hybrid modem 1500 can be controlled by a processor 1600. When radio outdoor unit 1400 is transmitting radio signals 1410, radio signal adapter 1450 can control an emitted radio power of radio outdoor unit 1400 and/or local FSOC installation 1100.

Optical signal adapter 1350 and/or radio signal adapter 1450 can control emitted power based on two or more sensed signals, S1, S2, which can be generated by an intrusion sensor 1700. In certain exemplary embodiments, intrusion sensor 1700 can comprise a capacitive proximity sensor, which can be comprised of a first conductive wire 1710 and a second conductive wire 1720 that are supported at predetermined heights, H1 and H2 respectively, by insulated posts 1730 around a perimeter of local FSOC installation 1100 at a predetermined distance K from the optical outdoor unit 1300, radio outdoor unit 1400, and/or predetermined equipment of local FSOC installation 1100. Electrically coupling first conductive wire 1710 to ground 1740 can be a first capacitor 1712. Electrically coupling second conductive wire 1720 to ground 1740 can be a second capacitor 1722.

When intrusion sensor 1700, optical signal adapter 1350, and/or radio signal adapter 1450 detects an intruder within a vicinity of optical outdoor unit 1300, radio outdoor unit 1400, predetermined equipment of local FSOC installation 1100, and/or local FSOC installation 1100, a notification can be rendered to the intruder and/or a monitor of local FSOC installation 1100 by a notification device 1800. For example, a visual notification can be provided via a lamp, light, strobe, LED, OLED, LCD, display, monitor, electric paper, flag, sign, etc. As another example, an audible notification can be provided via a horn, annunciator, beeper, buzzer, whistle, speaker, siren, etc. Moreover, the notification device can comprise and/or activate a monitoring device, such as a still camera, video camera, microphone, or the like.

Figure 2:
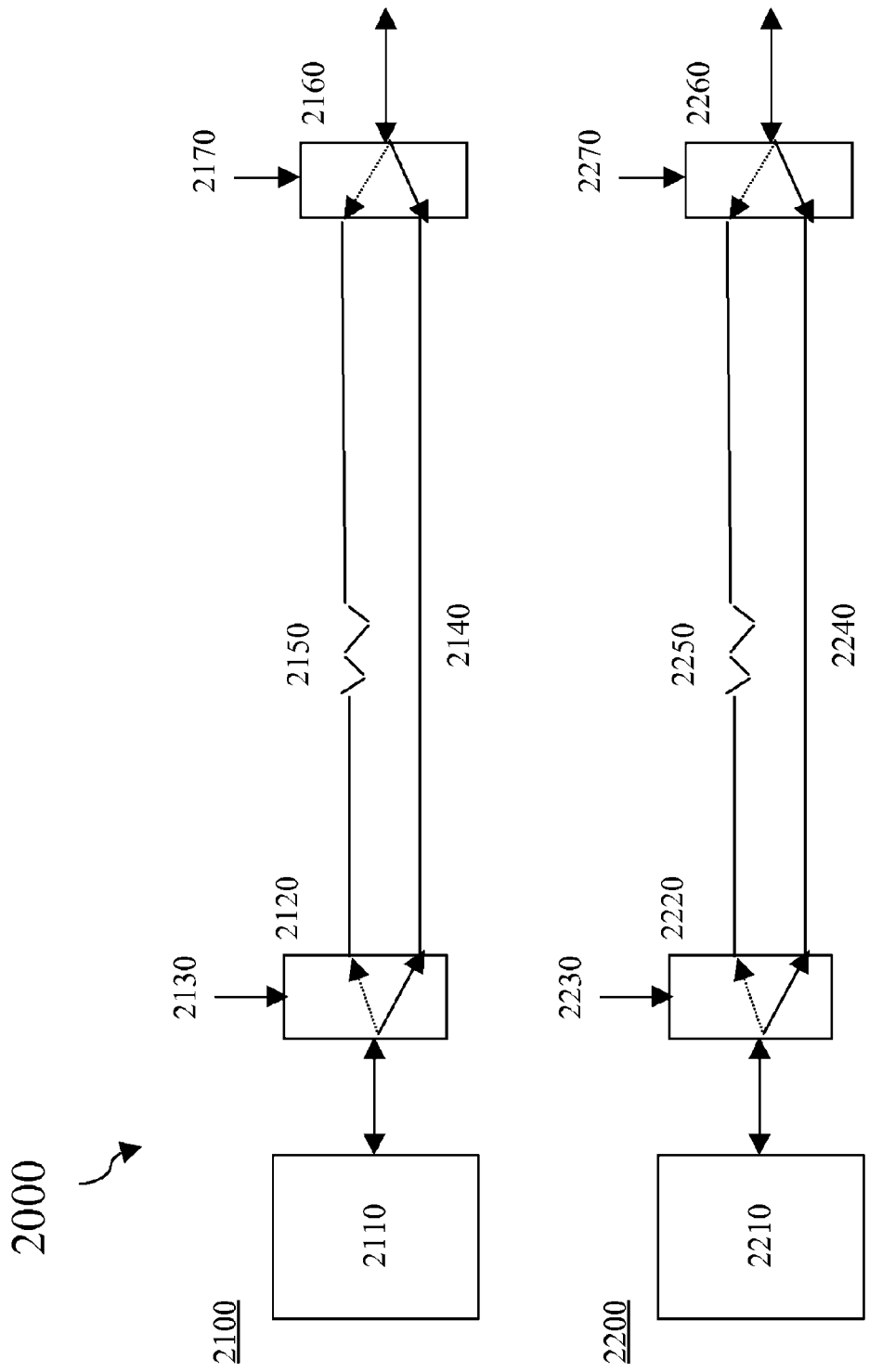
FIG. 2 is a block diagram of an exemplary embodiment of a switching system 2000.

FIG. 2 is a block diagram of an exemplary embodiment of a switching system 2000, which can comprise an optical switching system 2100 and/or a radio switching system 2200.

Optical switching system 2100 can receive an optical signal from an optical modem and/or an optical portion of a hybrid modem 2110. The optical signal can be switched at a first optical switch 2120, which can be controlled by a first control signal 2130, from a normal optical path 2140 to an attenuated optical path 2150. The optical signal can be received by a second optical switch 2160, which can be controlled by a second control signal 2170. From optical switch 2160, the optical signal can be emitted and/or further processed.

Radio switching system 2200 can receive a radio signal from a radio modem and/or a radio portion of a hybrid modem 2210. The radio signal can be switched at a first radio switch 2220, which can be controlled by a first control signal 1230, from a normal radio path 2240 to an attenuated radio path 2250. The radio signal can be received by a second radio switch 2260, which can be controlled by a second control signal 2270. From radio switch 2260, the radio signal can be emitted and/or further processed.

Figure 3:
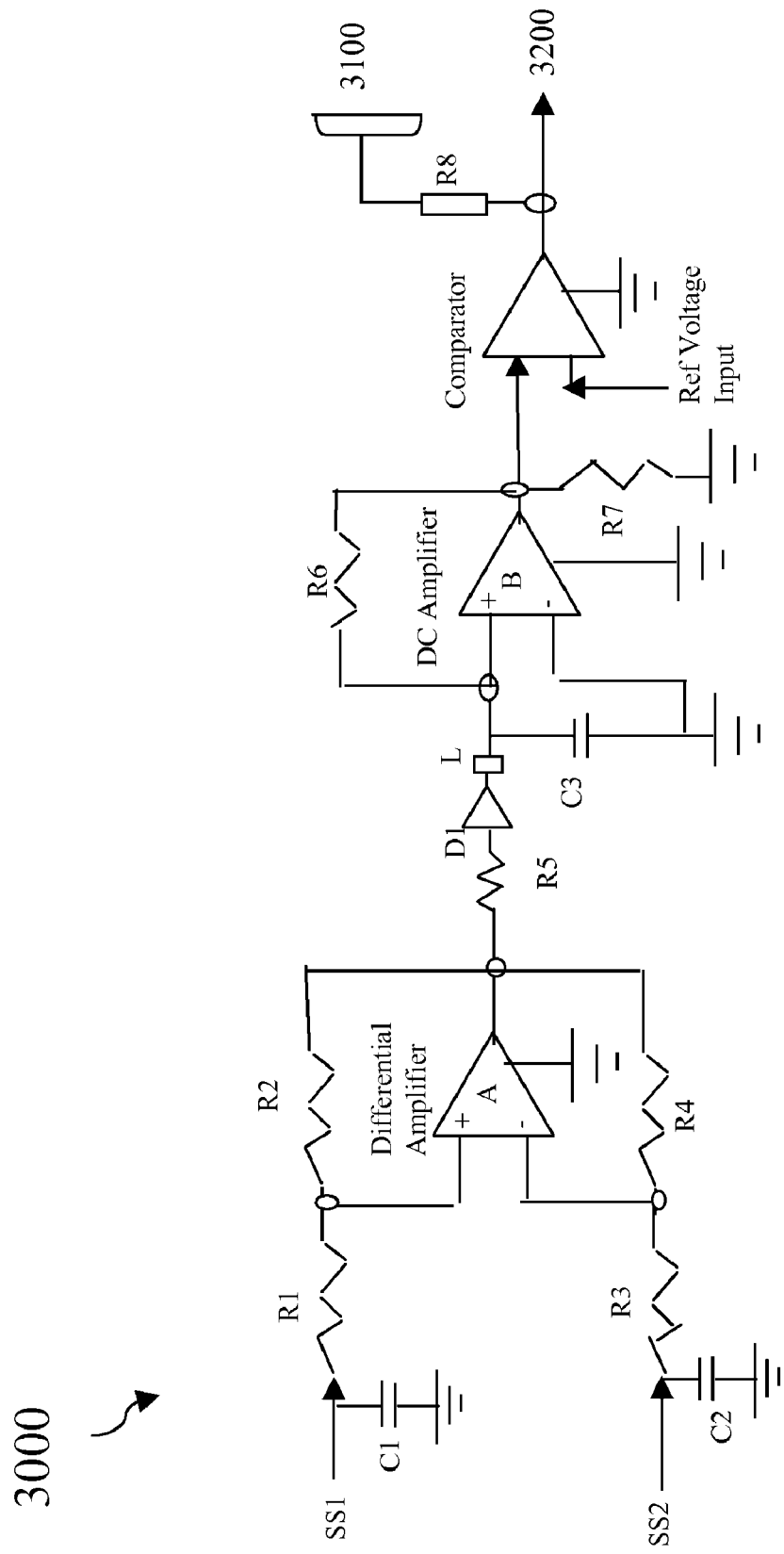
FIG. 3 is a diagram of an exemplary embodiment of control signal generator circuit 3000.

FIG. 3 is a diagram of an exemplary embodiment of control signal generator circuit 3000, which can process a first sensor signal SS1 and/or a second sensor signal SS2 to activate a notification device 3100 (such as for example notification device 1800 of FIG. 1) and/or to provide a control input 3200 to an optical switch and/or a radio switch (such as for example, optical switch 2120, optical switch 2160, radio switch 2220, and/or radio switch 2260 of FIG. 2).

Figure 4:
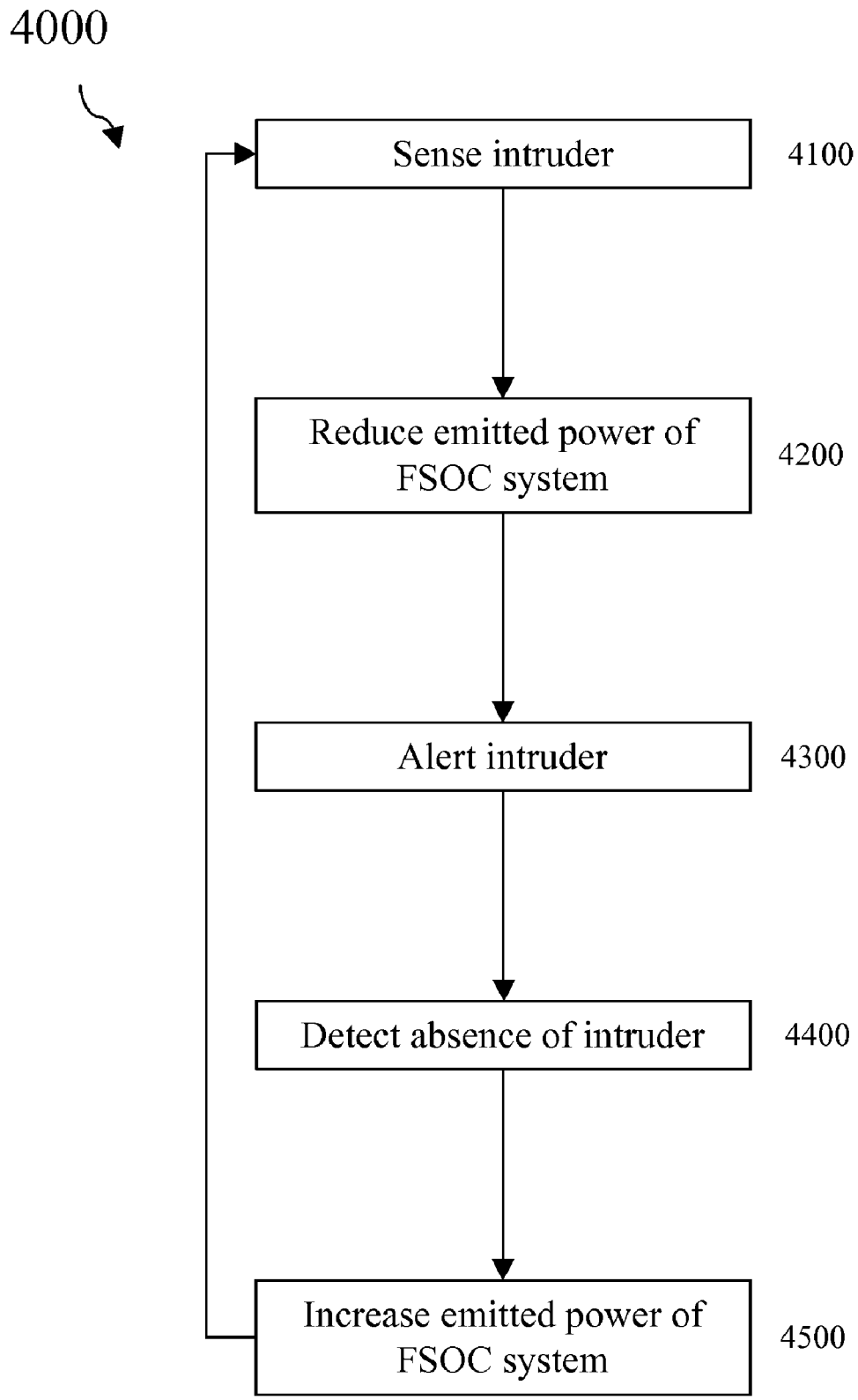
FIG. 4 is a flow diagram of an exemplary embodiment of a method 4000.

FIG. 4 is a flow diagram of an exemplary embodiment of a method 4000. At activity 4100, an intruder can be sensed within a predetermined vicinity and/or perimeter of an FSOC system, which can be a combined FSOC/radio system. The intruder can be sensed by any known sensing means, including for example, a proximity sensor, a capacitive proximity sensor, a photocell, an IR detector, etc. In certain exemplary embodiments, sensing can occur via a sensing means, such as a sensor that detects a change in capacitance, resistance, current, and/or voltage, etc., caused by the intruder. In certain exemplary embodiments, the sensing means can compare a value of a detected capacitance, resistance, current, and/or voltage, etc., to a reference value and if a predetermined difference is detected, provide a signal indicative of a detected intrusion.

At activity 4200, an emitted power of the FSOC system can be reduced, such as for example, to a level that is not hazardous to the intruder and/or to a level that allows a communications link involving the FSOC system to remain operative. In certain exemplary embodiments, a switch can be activated that causes an attenuation and/or reduction of the emitted power, via for example, an optical attenuator.

At activity 4300, the intruder can be alerted to a hazardous condition associated with the FSOC system. The alert can be rendered audibly and/or visually. The alert and/or notification of the presence of the intruder can be transmitted and/or provided to a monitor of the FSOC system, such as an operations personnel located remotely from the FSOC system and/or an automated monitoring system.

A monitoring and/or recording device, such as a video monitoring and/or recording device, can provide information regarding the FSOC system, intruder, and/or intrusion to a monitor of the FSOC system. For example, a video camera can provide continuous views of the FSOC system and/or its perimeter. As another example, a video camera/recorder system can be activated upon detection of the intruder to capture information regarding the intruder and/or intrusion.

At activity 4400, a movement and/or absence of the intruder can be detected. For example, an exit and/or absence of the intruder from within a predetermined vicinity of the FSOC system can be detected and/or transmitted. This detection can occur manually and/or automatically. For example, an operations personnel can travel to the FSOC system and assure that the intruder has departed predetermined vicinity of the FSOC system. As another example, the exit of the intruder can be detected via the sensors and/or via the monitoring system.

At activity 4500, an emitted power of the FSOC system can be increased. This increase can occur manually and/or automatically. For example, an operations personnel can authorize, command, and/or cause the power increase, such as via utilizing a manual switch and/or dial. As another example, power can be automatically increased after a predetermined period of time has elapsed with no indication of the intruder in the vicinity.

In certain exemplary embodiments, a capacitive proximity sensor can comprise at least a single wire placed parallel to the ground and that develops a capacitance C0. The value of the capacitance can depend on the height of the wire above ground, the temperature, and/or the humidity. In certain exemplary embodiments, two such wires can be mounted on insulated posts, parallel to the ground, to enclose a hybrid FSOC/Radio system installation site. The distance from the Hybrid FSOC/Radio system to the wires can be any appropriate value, such as from approximately 5 to approximately 50 feet on one or more sides. Two wires (e.g., wire 1 and wire 2) can be used so that variation in the capacitance due to temperature and humidity can be nullified. The wires can be placed on the insulated posts at first height (e.g., about 4 feet to about 7 feet) for wire 1, and at a second height (e.g. about 1 feet to about 4 feet) for wire 2. The dielectric between the wires and ground is air with a dielectric constant of 1. The capacitance due to wire 1-to-ground can be modeled as:

$$C01 = 7.354/\text{LOG}(4(H1/D1)) \tag{1}$$

where H1 is the height of wire 1 above ground and D1 is the wire 1 diameter.

Similarly, the capacitance due to wire 2-to-ground can be modeled as:

$$C02 = 7.354/\text{LOG}(4(H2/D2)) \tag{2}$$

where H2 is the height of wire 2 above ground, and D2 is the wire 2 diameter.

An intruder's dielectric constant can be several decades greater than air (approximately 80 times). If an intruder wanders beneath the wires, the capacitance can increase by several decades (80 times), inducing some charges, and thus some voltages on the wires. The induced voltage can be calculated from the equations below:

$$I = C dv/dt \tag{3}$$

$$It = CV = Q \tag{4}$$

$$V = Q/C \tag{5}$$

where I is the induced current on the wire, Q is the induced charge, V is the induced voltage, t is the time it takes to build up the charge Q, and C is the capacitance of the intruder and air dielectric.

An FSOC/Radio signal adapter unit (FR-SAU) can receive optical and electrical inputs. The optical section can have a through path with low loss, and high attenuation path for minimum power link operation. Each optical path can be selectable by optical switches. Similarly, the radio section can have a through path with low loss, and high attenuation path for minimum power link operation. Each radio path can be selectable by electrical switches. A control signal generator circuit can provide control signals to the switches.

The voltages from equation (5) can be summed up in a first differential amplifier, which can be located inside an FSOC/Radio signal adapter unit (FR-SAU). In this first differential amplifier, the variation due to temperature and humidity can be removed. The resultant signal can be detected, filtered, and/or sent to a DC amplifier for further amplification. The output of the DC amplifier can be compared with a reference voltage in a comparator. If the received voltage is greater than the reference voltage, the output of the comparator can change state from a low to a high state. In this high state, the comparator output can drive a siren to sound an alarm until the intruder withdraws. The length of the time the alarm is on can be proportional to the time constant, C (R1+R2), where C is the sum of the capacitances. The output of the comparator can control the optical and/or electrical switches in the FR-SAU.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method, comprising:
responsive to a detection of an intruder within a predetermined vicinity of a Free Space Optical Communication FSOC system, reducing an emitted power of said FSOC system to a level that is not hazardous to said intruder and allows a communications link involving said FSOC system to remain operative, said emitted power an emitted optical power or an emitted radio power.

2. The method of claim 1, further comprising:
via said FSOC system, providing a signal adapted to sound an alarm to alert said intruder of a radiation danger.

3. The method of claim 1, further comprising:
via said FSOC system, providing a signal adapted to activate a video recording device to capture evidence of said intruder.

4. The method of claim 1, further comprising:
via said FSOC system, providing a signal adapted to notify a central office regarding said intruder.

5. The method of claim 1, further comprising:
via said FSOC system, providing a signal adapted to increase said emitted power responsive to a determination that said intruder is no longer within said predetermined vicinity of said FSOC system.

6. A method, comprising:
responsive to a detection of an intruder within a predetermined vicinity of a Free Space Optical Communication (FSOC) system, said detection of said intruder via a proximity sensor, reducing an emitted power of said FSOC system to a level that is not hazardous to said intruder and allows a communications ink involving said FSOC system to remain operative, said emitted power an emitted optical power or an emitted radio power.

7. The method of claim 6, further comprising:
alerting said intruder to a hazardous condition associated with said FSOC system.

8. The method of claim 6, further comprising:
rendering an alarm to said intruder.

9. The method of claim 6, further comprising:
activating a video recording device.

10. The method of claim 6, further comprising:
providing a notification regarding said intruder.

11. The method of claim 6, further comprising:
detecting an absence of said intruder from said predetermined vicinity of said FSOC system.

12. The method of claim 6, further comprising:
automatically increasing said emitted power of said FSOC system responsive to a detected absence of said intruder from said predetermined vicinity of said FSOC system.

13. The method of claim 6, wherein said FSOC system comprises a radio system.

14. A system comprising:
a means for sensing an intruder within a predetermined vicinity of a Free Space Optical Communication (FSOC) subsystem; and
a switch adapted to reduce an emitted power of said FSOC subsystem in response to sensing said intruder to a non-zero level that is not hazardous to said intruder and allows a communications link involving said FSOC subsystem to remain operative, said emitted power an emitted optical power or an emitted radio power.

15. The system of claim 14, further comprising:
said Free Space Optical Communication (FSOC) subsystem.

16. The system of claim 14, further comprising:
said Free Space Optical Communication (FSOC) subsystem, wherein said FSOC subsystem comprises a radio subsystem.

17. The system of claim 14, wherein said switch comprises an optical attenuator.

18. A method, comprising:
sensing an intruder within a predetermined vicinity of a Free Space Optical Communication (FSOC) system; and
while said intruder is sensed, reducing an emitted power of said FSOC system to a level that is not hazardous to said intruder and allows a communications link involving said FSOC system to remain operative, said emitted power an emitted optical power or an emitted radio power.

* * * * *